United States Patent
Cho

(10) Patent No.: US 9,987,916 B2
(45) Date of Patent: Jun. 5, 2018

(54) APPARATUS AND METHOD OF CONTROLLING MOTOR FOR REDUCING VIBRATION OF ELECTRIC VEHICLE

(71) Applicant: Hyundai Motor Company, Seoul (KR)

(72) Inventor: Woocheol Cho, Daejeon (KR)

(73) Assignee: Hyundai Motor Company, Seoul (KR)

(*) Notice: Subject to any disclaimer, the term of this patent is extended or adjusted under 35 U.S.C. 154(b) by 252 days.

(21) Appl. No.: 14/937,608

(22) Filed: Nov. 10, 2015

(65) Prior Publication Data

US 2017/0072805 A1   Mar. 16, 2017

(30) Foreign Application Priority Data

Sep. 10, 2015 (KR) .......................... 10-2015-0128551

(51) Int. Cl.
   *B60K 6/26* (2007.10)
   *B60L 15/20* (2006.01)
   (Continued)

(52) U.S. Cl.
   CPC ............... *B60K 6/26* (2013.01); *B60K 6/387* (2013.01); *B60K 6/48* (2013.01); *B60K 6/547* (2013.01); *B60L 7/14* (2013.01); *B60L 11/14* (2013.01); *B60L 11/1861* (2013.01); *B60L 15/2009* (2013.01); *B60W 20/13* (2016.01);
   (Continued)

(58) Field of Classification Search
   CPC . B60K 6/26; B60K 6/387; B60K 6/48; B60K 6/547; B60W 20/13; B60W 20/17; B60W 30/18127; B60W 30/20; B60L 7/14; B60L 11/14; B60L 11/1861; B60L 15/2009

See application file for complete search history.

(56) References Cited

U.S. PATENT DOCUMENTS

2011/0266760 A1* 11/2011 Itabashi ................. B60L 11/14
                                                         280/5.507
2012/0245773 A1*  9/2012 Suzuki ................... B60L 15/20
                                                         701/22

(Continued)

FOREIGN PATENT DOCUMENTS

JP   09-215106 A    8/1997
JP   2004-236381 A  8/2004
(Continued)

Primary Examiner — Thomas G Black
Assistant Examiner — Sze-Hon Kong
(74) Attorney, Agent, or Firm — Mintz Levin Cohn Ferris Glovsky and Popeo, P.C.; Peter F. Corless

(57) ABSTRACT

An apparatus and a method of controlling a motor are provided for reducing vibration of an electric vehicle that maximize regenerative energy by limiting a vibration reduction torque at a maximum regenerative braking torque region of a motor. The method includes comparing a battery state of charge (SOC) with a predetermined SOC when a regenerative braking of the electric vehicle is required and calculating a size of vibration component of the electric vehicle when the battery SOC is less than the predetermined SOC. Further, the size of vibration component is compared with a first predetermined value and a vibration reduction torque of a driving direction is limited when the size of vibration component is less than the first predetermined value.

12 Claims, 3 Drawing Sheets

(51) Int. Cl.
- *B60L 7/14* (2006.01)
- *B60L 11/14* (2006.01)
- *B60L 11/18* (2006.01)
- *B60K 6/387* (2007.10)
- *B60K 6/48* (2007.10)
- *B60K 6/547* (2007.10)
- *B60W 30/18* (2012.01)
- *B60W 30/20* (2006.01)
- *B60W 20/13* (2016.01)
- *B60W 20/17* (2016.01)

(52) U.S. Cl.
CPC ...... *B60W 20/17* (2016.01); *B60W 30/18127* (2013.01); *B60W 30/20* (2013.01); *B60K 2006/4825* (2013.01); *B60L 2210/40* (2013.01); *B60L 2240/423* (2013.01); *B60L 2270/145* (2013.01); *B60W 2030/206* (2013.01); *B60W 2510/244* (2013.01); *B60W 2540/10* (2013.01); *B60W 2540/12* (2013.01); *B60W 2710/083* (2013.01); *B60Y 2200/92* (2013.01); *B60Y 2300/18125* (2013.01); *B60Y 2300/20* (2013.01); *Y02T 10/645* (2013.01); *Y02T 10/70* (2013.01); *Y02T 10/7005* (2013.01); *Y02T 10/705* (2013.01); *Y02T 10/7044* (2013.01); *Y02T 10/7077* (2013.01); *Y02T 10/7241* (2013.01); *Y02T 10/7275* (2013.01); *Y10S 903/906* (2013.01); *Y10S 903/947* (2013.01)

(56) References Cited

U.S. PATENT DOCUMENTS

| | | | | |
|---|---|---|---|---|
| 2013/0166165 | A1* | 6/2013 | Murata | B60W 10/06 701/70 |
| 2014/0288755 | A1* | 9/2014 | Murakami | B60K 6/48 701/22 |
| 2015/0123624 | A1* | 5/2015 | Ookawa | B60W 30/02 322/22 |
| 2015/0191089 | A1* | 7/2015 | Yamamoto | B60L 7/18 701/22 |
| 2016/0304084 | A1* | 10/2016 | Kawai | B60W 10/06 |

FOREIGN PATENT DOCUMENTS

| | | |
|---|---|---|
| JP | 2006-067687 A | 3/2006 |
| JP | 2010-089619 A | 4/2010 |
| JP | 2011-131829 A | 7/2011 |
| JP | 2014-050130 A | 3/2014 |
| KR | 1020130068411 A | 6/2013 |
| KR | 10-1448746 B1 | 10/2014 |

\* cited by examiner

APPARATUS AND METHOD OF CONTROLLING MOTOR FOR REDUCING VIBRATION OF ELECTRIC VEHICLE

CROSS-REFERENCE TO RELATED APPLICATION

This application claims priority to and the benefit of Korean Patent Application No. 10-2015-0128551 filed in the Korean Intellectual Property Office on Sep. 10, 2015, the entire contents of which are incorporated herein by reference.

BACKGROUND

(a) Field of the Invention

The present invention relates to an apparatus and a method of controlling a motor for reducing vibration of an electric vehicle, and more particularly, to an apparatus and a method of controlling a motor for reducing vibration of an electric vehicle that maximize regenerative energy by limiting a vibration reduction torque at a maximum regenerative braking torque region of a motor.

(b) Description of the Related Art

Generally, environmentally-friendly vehicles such as an electric vehicle, a fuel cell vehicle and a hybrid electric vehicle are operated by a driving motor which generates torque by electrical energy. The electric vehicle uses power of the driving motor operated by power of a battery and the hybrid electric vehicle uses a combination of power from an internal combustion engine and the driving motor. The electric vehicles using the driving motor do not have a damping element between the motor and a driving shaft, causing vibration to generate due to the torque of the motor. In the electric vehicle, since the damping element is omitted, vibration such as shock and jerk as well as vibration of a driving shaft occur during shifting and tip-in/out (e.g., operation of pressing or separating accelerator pedal, disengaging and engaging the pedal) occur which results in deterioration of ride comfort and drivability.

Thus, the electric vehicle including the driving motor may use a vibration reduction (e.g., anti-jerk) logic to reduce vibration of the vehicle. The vibration reduction logic recognizes a deviation (e.g., a difference) between model speed and actual speed of the motor as vibration, and multiplies the deviation between the two speeds by a predetermined value to obtain a result, and feeds back the result to suppress the vibration. In other words, vibration reduces by applying a positive torque or a negative torque based on a currently generated torque according to vibration of the motor. However, according to a conventional art, a vibration reduction logic is also applied at a maximum regenerative braking torque region of a motor. Thus, an output of the regenerative braking torque may be decreased compared to a maximum regenerative braking torque of the motor. Accordingly, regenerative braking energy may decrease.

The above information disclosed in this section is merely for enhancement of understanding of the background of the invention and therefore it may contain information that does not form the prior art that is already known in this country to a person of ordinary skill in the art.

SUMMARY

The present invention provides an apparatus and a method of controlling a motor for reducing vibration of an electric vehicle having advantages of maximizing regenerative energy by limiting a vibration reduction torque at a maximum regenerative braking torque region of a motor.

An exemplary embodiment of the present invention provides a method of controlling a motor for reducing vibration of an electric vehicle that may include comparing a battery state of charge (SOC) with a predetermined SOC when a regenerative braking of the electric vehicle is required; calculating a size of vibration component of the electric vehicle when the battery SOC is less than the predetermined SOC; comparing the size of vibration component with a first predetermined value; and limiting a vibration reduction torque of a driving direction when the size of vibration component is less than the first predetermined value. The method may further include maintaining the vibration reduction torque when the battery SOC is equal to or greater than to the predetermined SOC and maintaining the vibration reduction torque when the size of vibration component is equal to or greater than the first predetermined value.

Additionally, the method may include comparing the size of vibration component with a second predetermined value when the size of vibration component is less than the first predetermined value; reducing the vibration reduction torque of the driving direction when the size of vibration component is equal to or greater than the second predetermined value; and limiting the vibration reduction torque of the driving direction when the size of vibration component is less than the second predetermined value. The vibration reduction torque of the driving direction may be reduced by adjusting a gain of the vibration reduction torque.

Another exemplary embodiment of the present invention provides an apparatus of controlling a motor for reducing vibration of an electric vehicle that may include a driving information detector configured to detect a running state of the electric vehicle and demand information of a driver; and a controller configured to determine a vibration reduction torque based on a signal from the driving information detector and adjust a motor torque. The controller may further be configured to calculate a size of vibration component when a regenerative braking of the electric vehicle is required and a battery state of charge (SOC) is less than a predetermined SOC, and adjust the vibration reduction torque by comparing the size of vibration component with a first predetermined value.

In addition, the controller may be configured to maintain the vibration reduction torque when the battery SOC is equal to or greater than the predetermined SOC and maintain the vibration reduction torque when the size of vibration component is equal to or greater than the first predetermined value. The controller may be configured to compare the size of vibration component with a second predetermined value when the size of vibration component is less than the first predetermined value, reduce the vibration reduction torque of a driving direction when the size of vibration component is equal to or greater than the second predetermined value, and limit the vibration reduction torque of the driving direction when the size of vibration component is less than the second predetermined value. The controller may further be configured to reduce the vibration reduction torque of the driving direction by adjusting a gain of the vibration reduction torque.

As described above, according to an exemplary embodiment of the present invention, regenerative energy may be maximized by limiting the vibration reduction torque at a maximum regenerative braking torque region of the motor. Therefore, fuel efficiency of the electric vehicle may be improved.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
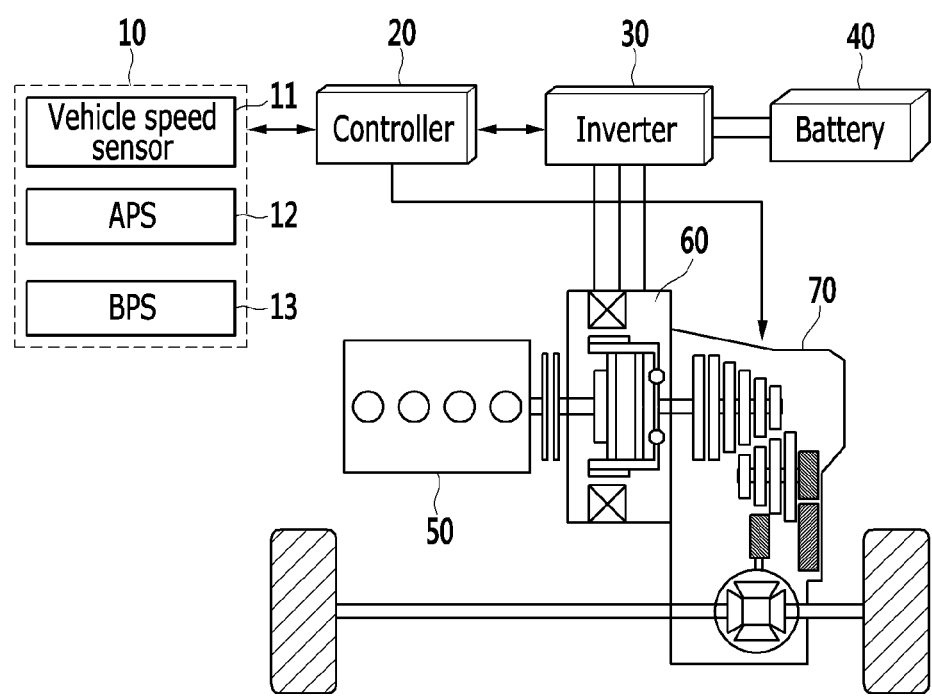
FIG. 1 is a block diagram of a system of controlling a motor for reducing vibration of an electric vehicle according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

In the present specification and the claims, it shall be appreciated that an electric vehicle is all of the vehicles using electricity as a power source, such as a plug in hybrid electric vehicle (PHEV) or hybrid electric vehicle (HEV) using electricity as a part of a power source, as well as an electric vehicle (EV) using electricity as the entirety of a power source. It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below. The methods may be executed by at least one controller.

Furthermore, the control logic of the present invention may be embodied as non-transitory computer readable media on a computer readable medium containing executable program instructions executed by a processor, a controller, or the like. Examples of computer readable media include, but are not limited to, ROM, RAM, compact disc (CD)-ROMs, magnetic tapes, floppy disks, flash drives, smart cards, and optical data storage devices. The computer readable recording medium can also be distributed in network coupled computer systems so that the computer readable media is stored and executed in a distributed fashion, e.g., by a telematics server or a controller area network (CAN).

An exemplary embodiment of the present invention will hereinafter be described in detail with reference to the accompanying drawings.

FIG. 1 is a block diagram of a system of controlling a motor for reducing vibration of an electric vehicle according to an exemplary embodiment of the present invention. As shown in FIG. 1, an apparatus of controlling a motor for reducing vibration of an electric vehicle according to an exemplary embodiment of the present invention may include a driving information detector 10, a controller 20, an inverter 30, a battery 40, an engine 50, a motor 60 and a transmission 70. The controller 20 may be configured to operate the driving information detector 10, the inverter 30, the battery 40, the engine 50, the motor 60, and the transmission 70.

The driving information detector 10 may be configured to detect a running state of the electric vehicle and demand information of a driver, and may include a vehicle speed sensor 11, an accelerator pedal position sensor 12 and a brake pedal position sensor 13. The vehicle speed sensor 11 may be configured to detect a speed of the electric vehicle, and transmit a corresponding signal to the controller 20. The vehicle speed sensor 11 may be mounted at a wheel of the electric vehicle.

Further, the accelerator pedal position sensor (APS) 12 may be configured to continuously detect a position value of an accelerator pedal and transmit a monitoring signal to the controller 20. The position value of the accelerator pedal may be 100% when the accelerator pedal is fully engaged, and the position value of the accelerator pedal may be 0% when the accelerator pedal is disengaged. In other words, the accelerator pedal position sensor 12 may be configured to detect data related to an acceleration intention (e.g., the amount of pressure being exerted onto the pedal). A throttle valve position sensor (TPS) mounted on an intake pipe may be used instead of the accelerator pedal position sensor 12.

Therefore, in this specification and the scope of the appended claims, the accelerator pedal position sensor 12 may include the throttle valve position sensor, and the position value of the accelerator pedal may be understood to be an opening value of the throttle valve. The brake pedal position sensor (BPS) 13 may be configured to continuously detect a position value of a brake pedal and transmit a monitoring signal to the controller 20. The position value of the brake pedal may be 100% when the brake pedal is fully engaged, and the position value of the brake pedal may be 0% when the brake pedal is disengaged. In other words, the brake pedal position sensor 12 may be configured to detect a regenerative braking requirement of the driver with the accelerator pedal position sensor 11.

The inverter 30 may be configured to drive the motor 60 by converting a direct-current (DC) voltage supplied from the battery 40 into a three-phase alternating voltage in response to a control signal from the controller 20. The inverter 30 may include a plurality of power switching elements and the power switching elements of the inverter 30 may each be implemented by any one of an insulated gate bipolar transistor (IGBT), a metal-oxide-semiconductor field-effect transistor (MOSFET), a transistor, and a relay.

The battery 40 may be formed with a plurality of unit cells, and a high voltage configured to provide a driving voltage to the motor 60 may be stored in the battery 40. The battery 40 may be operated by a battery management system (not shown) based on a charging state (e.g., a state of charge (SOC) of the battery), and may be prevented from overcharging under a critical voltage or over a critical voltage. The battery management system may be configured to transfer a charge state of the battery 40 to the controller 20 to enable a driving and regeneration control of the motor 60 to be executed.

The engine 50 mounted within a hybrid electric vehicle may be configured to output power as a power source while turning on based on a control signal from the controller 20. The motor 60 may be operated by a three-phase alternating current (AC) voltage applied from the inverter 30 to generate torque, and may be configured to operate as a power generator and supply regenerative energy to the battery 40 during coasting. The transmission 70 may be configured to adjust a shift ratio by operating engagement elements and disengagement elements, using hydraulic pressure based on a control signal from the controller 20. When the engine 50 is mounted within the electric vehicle, the engine clutch (not shown) may be disposed between the engine 50 and the driving motor 60 provide an electric vehicle (EV) mode and a hybrid electric vehicle (HEV) mode.

Furthermore, controller 20 may be configured to determine a vibration reduction torque based on a signal from the driving information detector 10 and adjust a torque of the motor 60. The controller 20 may be configured to calculate a size of vibration component when a regenerative braking of the electric vehicle is required and a battery state of charge (SOC) is less than a predetermined SOC, and adjust the vibration reduction torque by comparing the size of vibration component with a first predetermined value.

The controller 20 may then be configured to maintain the vibration reduction torque when the battery SOC is equal to or greater than the predetermined SOC or the size of vibration component is equal to or greater than the first predetermined value. Additionally, the controller 20 may be configured to compare the size of vibration component with a second predetermined value when the size of vibration component is less than the first predetermined value, reduce the vibration reduction torque of a driving direction when the size of vibration component is equal to or greater to the second predetermined value, and limit the vibration reduction torque of the driving direction when the size of vibration component is less than the second predetermined value. The controller 20 may be implemented as at least one processor that is operated by a predetermined program, and the predetermined program may be programmed to perform each step of a method for controlling a motor for reducing vibration of an electric vehicle according to an exemplary embodiment of the present invention.

Various exemplary embodiments described herein may be implemented within a recording medium that may be read by a computer or a similar device by using software, hardware, or a combination thereof, for example.

According to hardware implementation, the embodiments described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electric units designed to perform any other functions. According to software implementation, embodiments such as procedures and functions described in the present exemplary embodiments may be implemented by separate software modules. Each of the software modules may perform one or more functions and operations described in the present invention. A software code may be implemented by a software application written in an appropriate program language.

Hereinafter, a method of controlling a motor for reducing vibration of an electric vehicle according to an exemplary embodiment of the present invention will be described in detail with reference to the accompanying drawings.

Figure 2:
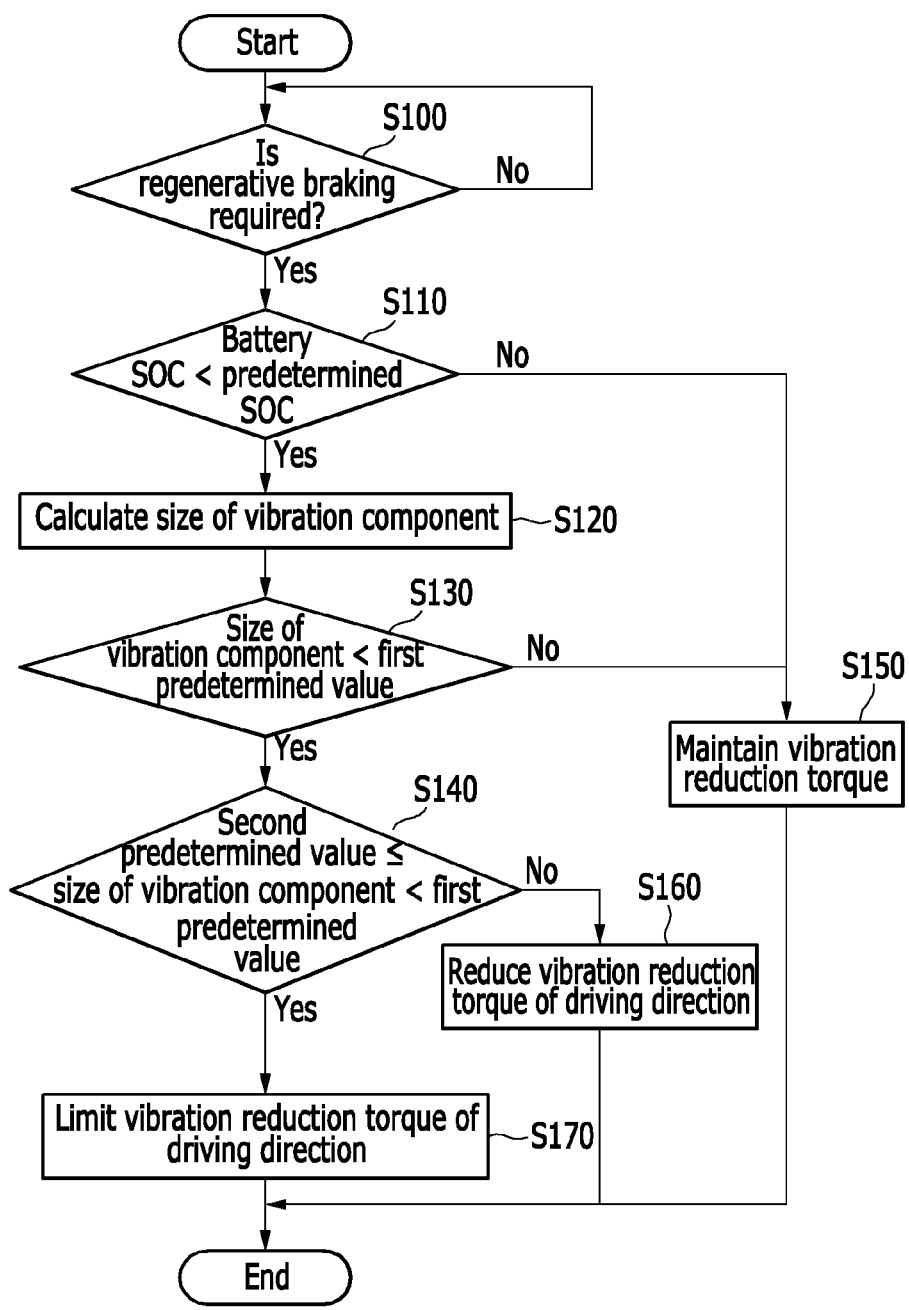
FIG. 2 is a flowchart showing a method of controlling a motor for reducing vibration of an electric vehicle according to an exemplary embodiment of the present invention.

FIG. 2 is a flowchart showing a method of controlling a motor for reducing vibration of an electric vehicle according to an exemplary embodiment of the present invention. As shown in FIG. 2, a method of controlling a motor for reducing vibration of an electric vehicle according to an exemplary embodiment of the present invention may begin with determining whether a regenerative braking of the electric vehicle is required based on a signal from the driving information detector 10 at step S100.

When the regenerative braking of the electric vehicle is required at the step S100, the controller 20 may be configured to compare a battery state of charge (SOC) with a predetermined SOC at step S110. When the battery SOC is less than the predetermined SOC at the step S110, the controller 20 may be configured to calculate a size of vibration component of the electric vehicle at step S120. The size of vibration component of the electric vehicle may be calculated based on a vehicle speed, a motor speed, and a wheel speed according to those skilled in the art, so detailed descriptions thereof will be omitted.

When the battery SOC is less than the predetermined SOC may indicate that the motor 60 enters a maximum regenerative braking torque region. Thus, the controller 20 may improve regenerative braking energy instead of reducing vibration. When the battery SOC is equal to or greater than the predetermined SOC at the step S110, the controller 20 may be configured to maintain a vibration reduction torque at step S150. When the size of vibration component of the electric vehicle is calculated at the step S120, the controller may be configured to compare the size of vibration component with a first predetermined value at step S130.

When the size of vibration component is equal to or greater than the first predetermined value at the step S130, the controller 20 may be configured to maintain the vibration reduction torque at step S150 since a strong vibration may be generated. Additionally, when the size of vibration component is less than the first predetermined value at the step S130, the controller 20 may be configured to compare the size of vibration component with a second predetermined value at step S140. When the size of vibration component is less than the second predetermined value at the step S140, the controller 20 may be configured to limit the vibration reduction torque of a driving direction at step S170.

In particular, vibration of the electric vehicle may be weak, and thus the controller 20 may be configured to maximize regenerative braking energy instead of reducing vibration by adjusting the vibration reduction torque. In other words, the controller 20 may be configured to apply the vibration reduction torque of a regenerative braking direction (e.g., negative torque) and not apply the vibration reduction torque of the driving direction (e.g., positive torque). Further, when the size of vibration component is equal to or greater than the second predetermined value at the step S140, the controller 20 may be configured to reduce the vibration reduction torque of the driving direction at step S160.

In other words, the controller 20 may be configured to apply the vibration reduction torque of the regenerative braking direction (negative torque) as it is, and apply the vibration reduction torque of the driving direction (positive torque) reduced by adjusting a gain of the vibration reduction torque. The controller 20 may be configured to reduce the vibration reduction torque of the driving direction by multiplying a predetermined factor in the range of 0 to 1 by the gain of the vibration reduction torque.

Figure 3:
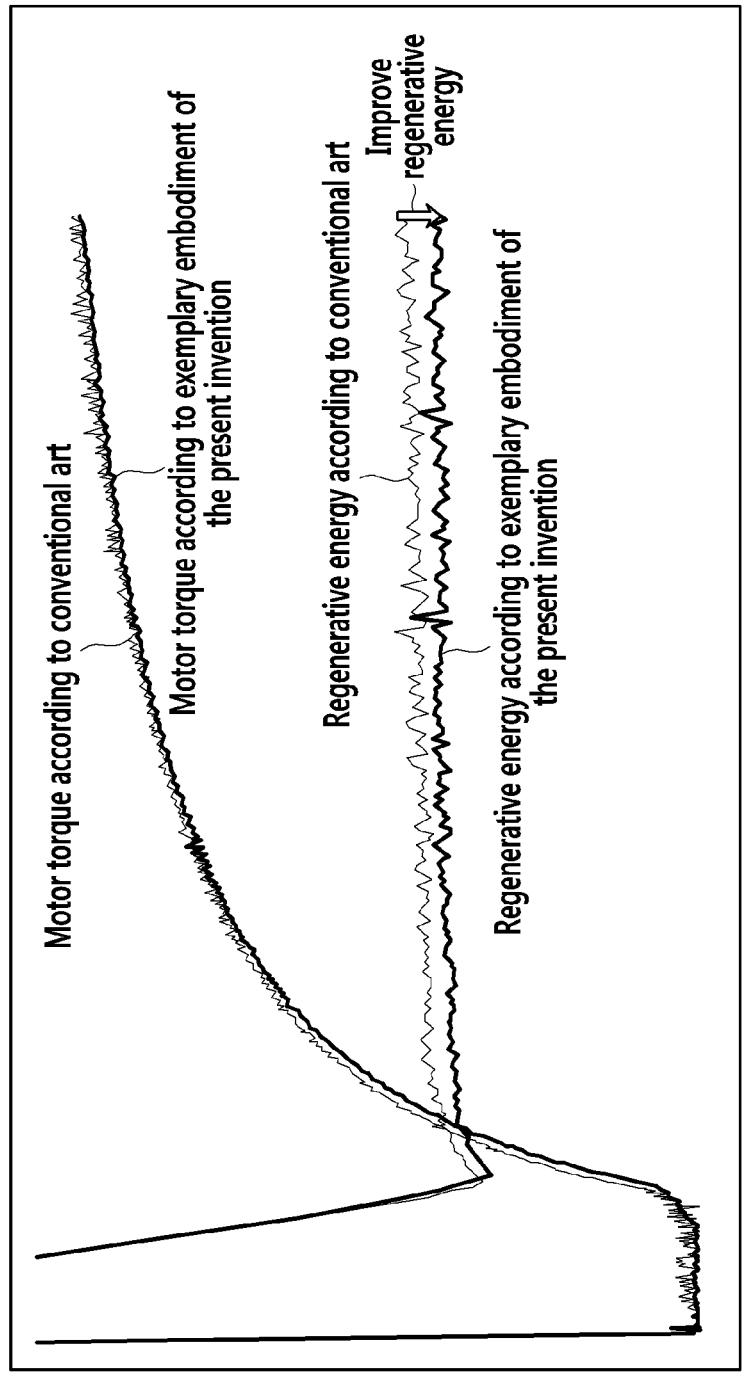
FIG. 3 is a drawing comparing regenerative energy of a motor according to a conventional art with regenerative energy of a motor according to an exemplary embodiment of the present invention.

FIG. 3 is a drawing comparing regenerative energy of a motor according to a conventional art with regenerative energy of a motor according to an exemplary embodiment of the present invention. As shown in FIG. 3, motor torques according to a conventional art and an exemplary embodiment of the present invention are maintains as same level, however, regenerative energy according to an exemplary embodiment of the present invention may be improved compared to regenerative energy according to a conventional art.

As described above, according to an exemplary embodiment of the present invention, the vibration reduction torque may be adjusted at a maximum regenerative braking torque region of the motor, thereby maximizing regenerative energy and improving fuel efficiency of the electric vehicle.

While this invention has been described in connection with what is presently considered to be exemplary embodiments, it is to be understood that the invention is not limited to the disclosed exemplary embodiments. On the contrary, it is intended to cover various modifications and equivalent arrangements included within the spirit and scope of the appended claims.

What is claimed is:

1. A method of controlling a motor for reducing vibration of an electric vehicle, comprising:
    comparing, by a controller, a battery state of charge (SOC) with a predetermined SOC when a regenerative braking of the electric vehicle is required;
    calculating, by the controller, a size of vibration component of the electric vehicle when the battery SOC is less than the predetermined SOC;
    comparing, by the controller, the size of vibration component with a first predetermined value;
    limiting, by the controller, a vibration reduction torque of a driving direction when the size of vibration component is less than the first predetermined value;
    comparing, by the controller, the size of vibration component with a second predetermined value when the size of vibration component is less than the first predetermined value;
    reducing, by the controller, the vibration reduction torque of the driving direction when the size of vibration component is equal to or greater than the second predetermined value; and
    limiting, by the controller, the vibration reduction torque of the driving direction when the size of vibration component is less than the second predetermined value.

2. The method of claim 1, further comprising:
    maintaining, by the controller, the vibration reduction torque when the battery SOC is equal to or greater than the predetermined SOC.

3. The method of claim 1, further comprising:
    maintaining, by the controller, the vibration reduction torque when the size of vibration component is equal to or greater than the first predetermined value.

4. The method of claim 1, wherein the vibration reduction torque of the driving direction is reduced by adjusting a gain of the vibration reduction torque.

5. An apparatus of controlling a motor for reducing vibration of an electric vehicle, comprising:
    a driving information detector configured to detect a running state of the electric vehicle and demand information of a driver; and
    a controller configured to determine a vibration reduction torque based on a signal from the driving information detector and adjust a motor torque,
    wherein the controller is configured to calculate a size of vibration component when a regenerative braking of the electric vehicle is required and a battery state of charge (SOC) is less than a predetermined SOC, and adjust the vibration reduction torque based on comparing the size of vibration component with a first predetermined value, and
    wherein the controller is further configured to:
    compare the size of vibration component with a second predetermined value when the size of vibration component is less than the first predetermined value;
    reduce the vibration reduction torque of a driving direction when the size of vibration component is equal to or greater than the second predetermined value; and
    limit the vibration reduction torque of the driving direction when the size of vibration component is less than the second predetermined value.

6. The apparatus of claim 5, wherein the controller is configured to maintain the vibration reduction torque when the battery SOC is equal to or greater than the predetermined SOC.

7. The apparatus of claim 5, wherein the controller is configured to maintain the vibration reduction torque when the size of vibration component is equal to or greater than the first predetermined value.

8. The apparatus of claim 5, wherein the controller is configured to reduce the vibration reduction torque of the driving direction by adjusting a gain of the vibration reduction torque.

9. A non-transitory computer readable medium containing program instructions executed by a controller, the computer readable medium comprising:
    program instructions that receive a running state of the electric vehicle and demand information of a driver;
    program instructions that determine a vibration reduction torque based on the received information to adjust a motor torque;
    program instructions that calculate a size of vibration component when a regenerative braking of the electric vehicle is required and a battery state of charge (SOC) is less than a predetermined SOC;
    program instructions that adjust the vibration reduction torque based on comparing the size of vibration component with a first predetermined value;
    program instructions that compare the size of vibration component with a second predetermined value when the size of vibration component is less than the first predetermined value;
    program instructions that reduce the vibration reduction torque of a driving direction when the size of vibration component is equal to or greater than the second predetermined value; and
    program instructions that limit the vibration reduction torque of the driving direction when the size of vibration component is less than the second predetermined value.

10. The non-transitory computer readable medium of claim 9, further comprising:
 program instructions that maintain the vibration reduction torque when the battery SOC is equal to or greater than the predetermined SOC.

11. The non-transitory computer readable medium of claim 9, further comprising:
 program instructions that maintain the vibration reduction torque when the size of vibration component is equal to or greater than the first predetermined value.

12. The non-transitory computer readable medium of claim 9, further comprising:
 program instructions that reduce the vibration reduction torque of the driving direction by adjusting a gain of the vibration reduction torque.

\* \* \* \* \*